(12) United States Patent
Hirano et al.

(10) Patent No.: US 6,659,907 B2
(45) Date of Patent: Dec. 9, 2003

(54) DUAL CAVITY TOROIDAL TYPE CVT WITH COMMON OUTPUT DISC

(75) Inventors: Hiroyuki Hirano, Kanagawa (JP); Masaki Nakano, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/940,875

(22) Filed: Aug. 29, 2001

(65) Prior Publication Data

US 2002/0028723 A1 Mar. 7, 2002

(30) Foreign Application Priority Data

Sep. 6, 2000 (JP) ........................................ 2000-270075

(51) Int. Cl.$^7$ .............................................. F16H 15/38
(52) U.S. Cl. ........................................... 476/42; 476/40
(58) Field of Search .............................. 476/40, 42, 46

(56) References Cited

U.S. PATENT DOCUMENTS

| | | | | |
|---|---|---|---|---|
| 3,430,504 A | * | 3/1969 | Dickenbrock | 476/42 |
| 4,968,289 A | | 11/1990 | Nakano | 475/185 |
| 5,419,746 A | | 5/1995 | Nakano | 476/10 |
| 5,902,208 A | | 5/1999 | Nakano | 476/42 |

FOREIGN PATENT DOCUMENTS

| | | |
|---|---|---|
| JP | 1-193454 | 8/1989 |
| JP | 5-126222 | 5/1993 |
| JP | 6-307514 | 11/1994 |
| JP | 11-51136 | 2/1999 |
| JP | 11-63139 | 3/1999 |
| JP | 2000-145920 | * 5/2000 |

* cited by examiner

*Primary Examiner*—William C Joyce
(74) *Attorney, Agent, or Firm*—Foley & Lardner

(57) ABSTRACT

A dual cavity toroidal type CVT includes two toroidal transmission units (31, 32). A torque delivery shaft (27) carries a first input disc (35) and a second input disc (36) coaxially for a unitary rotation. A third common output disc (37) between the first and second input discs (35, 36) has an output gear (73) fixedly attached to an outer periphery thereof. Radial bearings (39, 40) received in peripheral grooves (27a, 27b) of the torque delivery shaft (27) are in rolling contact with a central opening defining wall of the third common output disc (37). Two supports (41, 42) are fixedly attached to a transmission casing (21) and bear thrust load tending to tilt the third common output disc (37) from a predetermined normal upright position, thereby to hold the third common output disc (37) in the predetermined normal upright position.

3 Claims, 6 Drawing Sheets

DUAL CAVITY TOROIDAL TYPE CVT WITH COMMON OUTPUT DISC

BACKGROUND OF THE INVENTION

The present invention relates to a toroidal type continuously variable transmission (CVT), and more particularly to a dual cavity toroidal type CVT.

A dual cavity toroidal type CVT is known from JP-A 11-63139. FIG. 6 is a schematic view of the known CVT. Referring to FIG. 6, the CVT includes two toroidal transmission units 2, which include coaxial front and rear input discs 2a, a common output disc 2b, and power rollers 2c. An output gear 5 is fixedly attached to output disc 2b. Among power rollers 2c, two are interposed between front input disc 2a and output disc 2b, while the other two between rear input disc 2a and output disc 2b. A sleeve 3 passes through a central bore of output disc 2b and carries front and rear input discs 2a for a unitary rotation. A shaft 6 extends through sleeve 3. Via shaft 6, rotation of a crankshaft of an engine 1 is transmitted to a loading cam 4. Loading cam 4 drives rear input disc 2a.

JP-A 1-193454 discloses a structure for supporting two output discs of a dual cavity toroidal type CVT. According to this known supporting structure, a transmission casing has an integral support wall. The support wall extends into a space between the output discs. Radial and thrust bearings are interposed between the support wall and the output discs. Via these bearings, the support wall supports the output discs against radial and thrust loads.

JP-A 6-307514 discloses a structure for supporting two output discs of a dual cavity toroidal type CVT. In this known structure, a stationary sleeve is fixedly attached to a transmission casing by posts. This sleeve supports the two output discs via radial bearings. A shaft extends through the sleeve and carries two axially spaced input discs for a unitary rotation.

JP-A 11-51136 discloses a structure to support a shaft against radial and thrust loads. The shaft extends through a sleeve and central bores of two output discs. The output discs are fixedly attached to one and opposite end portions of the sleeve. An output gear is disposed between the output disc and formed integral with the sleeve. Via radial bearings, the shaft supports the output discs. Two spaced supports have radial bearings, respectively, to support the shaft against radial load. A support wall of a transmission casing has a ball bearing to support the shaft against thrust load. In another example, two spaced supports have ball bearings, respectively, to support the shaft against not only radial load but also thrust load, JP-A 5-126222 discloses a dual cavity toroidal type CVT. In this known CVT, an output shaft carries two spaced output discs for a unitary coaxial rotation. Two input discs are fixedly coupled to a sleeve through which the output shaft extends. Loading cams are interposed between the two input discs.

The known toroidal type CVTs are satisfactory to some extent. However, a need remains for development of a dual cavity toroidal type CVT employing a common output disc having a peripheral output gear. Such toroidal type CVT has a problem that thrust load applied to a common output disc from the output gear tends to tilt the disc from a predetermined normal upright position thereof.

SUMMARY OF THE INVENTION

An object of the present invention is to provide a toroidal type CVT having a structure to cope with thrust load tending to tilt a disc from a predetermined normal upright position thereof.

Another object of the present invention is to provide an easy to assemble structure to cope with thrust load tending to tilt a disc.

According to one aspect of the present invention, a toroidal type continuously variable transmission (CVT) comprises:

two toroidal transmission units having a first disc, a second disc, a third disc, and a torque delivery shaft carrying the first and second discs coaxially for a unitary rotation therewith, the third disc being a common disc to the first and second discs and disposed between the first and second discs in operative cooperation therewith, the third disc having a peripheral gear and a central bore through which the torque delivery shaft extends, the third disc having a wall defining the central bore;

at least one radial bearing in rolling contact with the central bore defining wall and the torque delivery shaft for allowing a rotational displacement between the third disc and the torque delivery shaft; and supports interposing therebetween the third disc to bear thrust load tending to tilt the third disc from a predetermined position to hold the third disc in the predetermined position.

BRIEF DESCRIPTION OF THE DRAWINGS

Further objects and advantages of the invention will be apparent from reading of the following description in conjunction with the accompanying drawings.

DESCRIPTION OF THE PREFERRED EMBODIMENT

Figure 1:
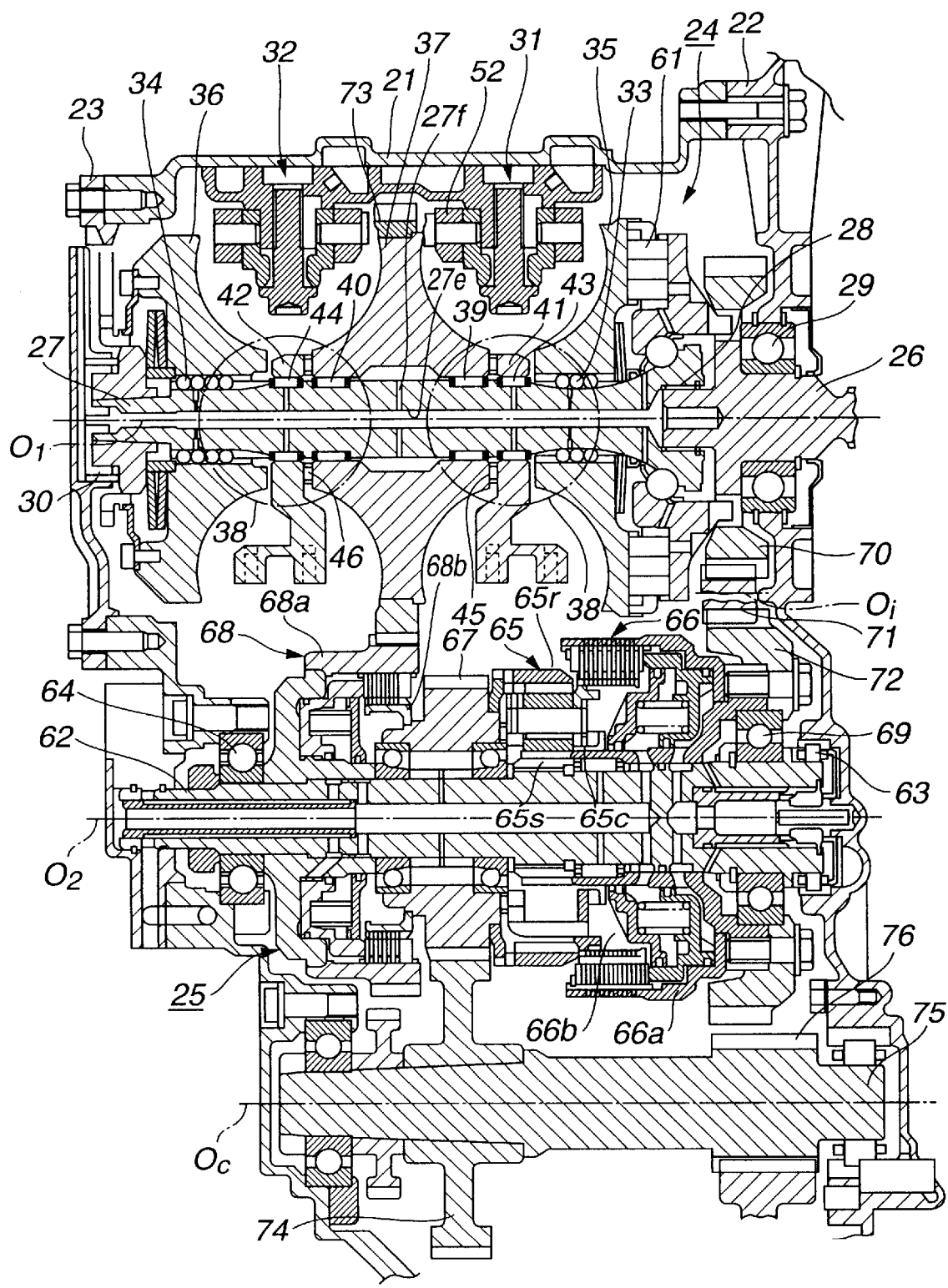
FIG. 1 is a sandwich open view illustrating various sections of a transaxle employing a dual cavity toroidal type CVT according to the present inventions, the various sections being provided by taking along a plurality of axes $O_1$, $O_2$ and $O_c$ shown in FIG. 2.
Figure 2:
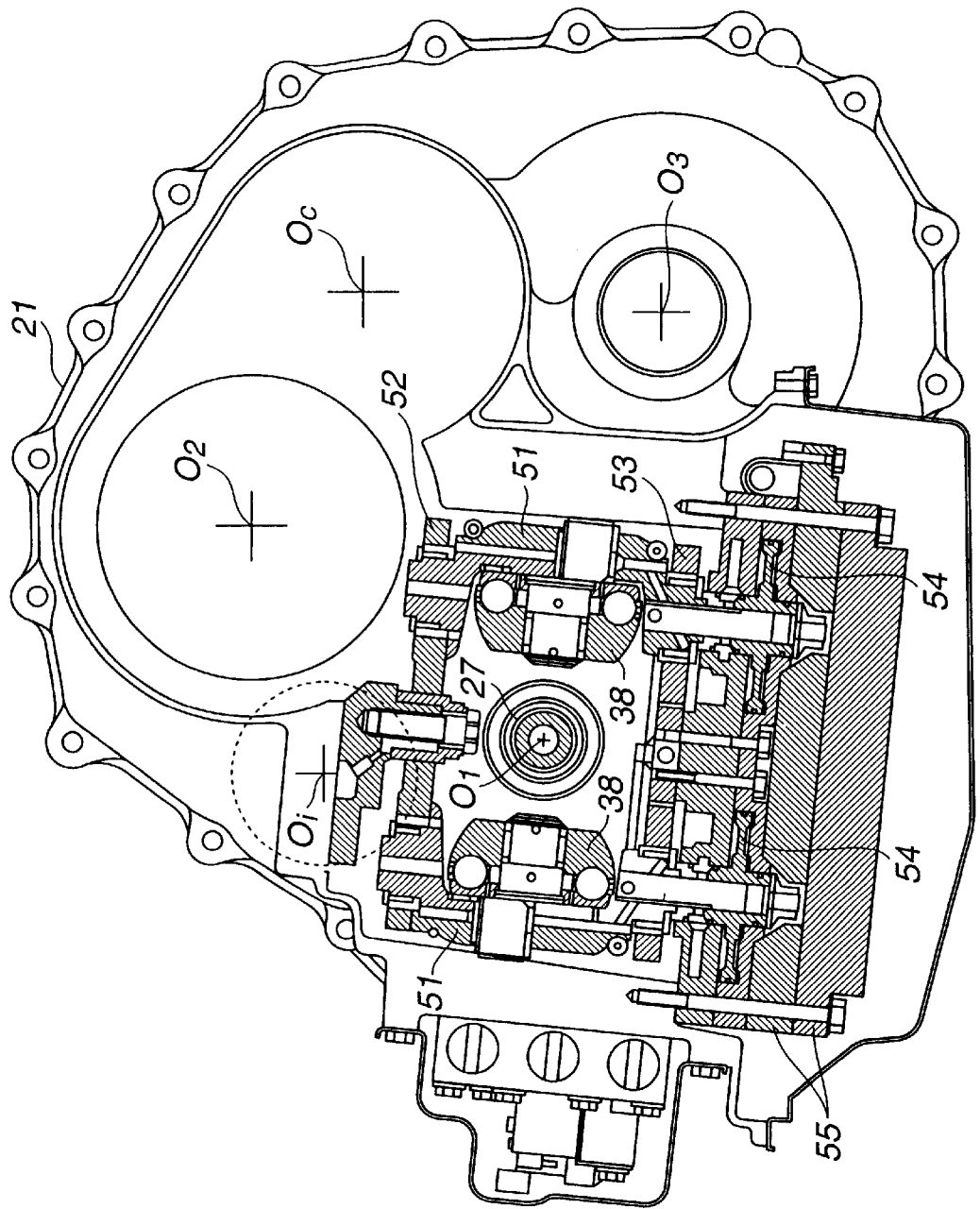
FIG. 2 is a rear end view of the transaxle with a rear cover removed to show a transverse section of the CVT.

Referring to FIGS. 1 and 2, a transaxle includes a dual cavity toroidal type CVT 24 according to the present invention. The reference numeral 21 indicates a transmission casing. As shown in FIG. 1, casing 21 has a front cover 22 and a rear cover 23. As best seen in FIG. 2, the transaxle has three parallel axes, namely, a first axis $O_1$, a second axis $O_2$, and a third axis $O_3$, an idler axis $O_I$, and a counter axis $O_c$.

Figure 4:
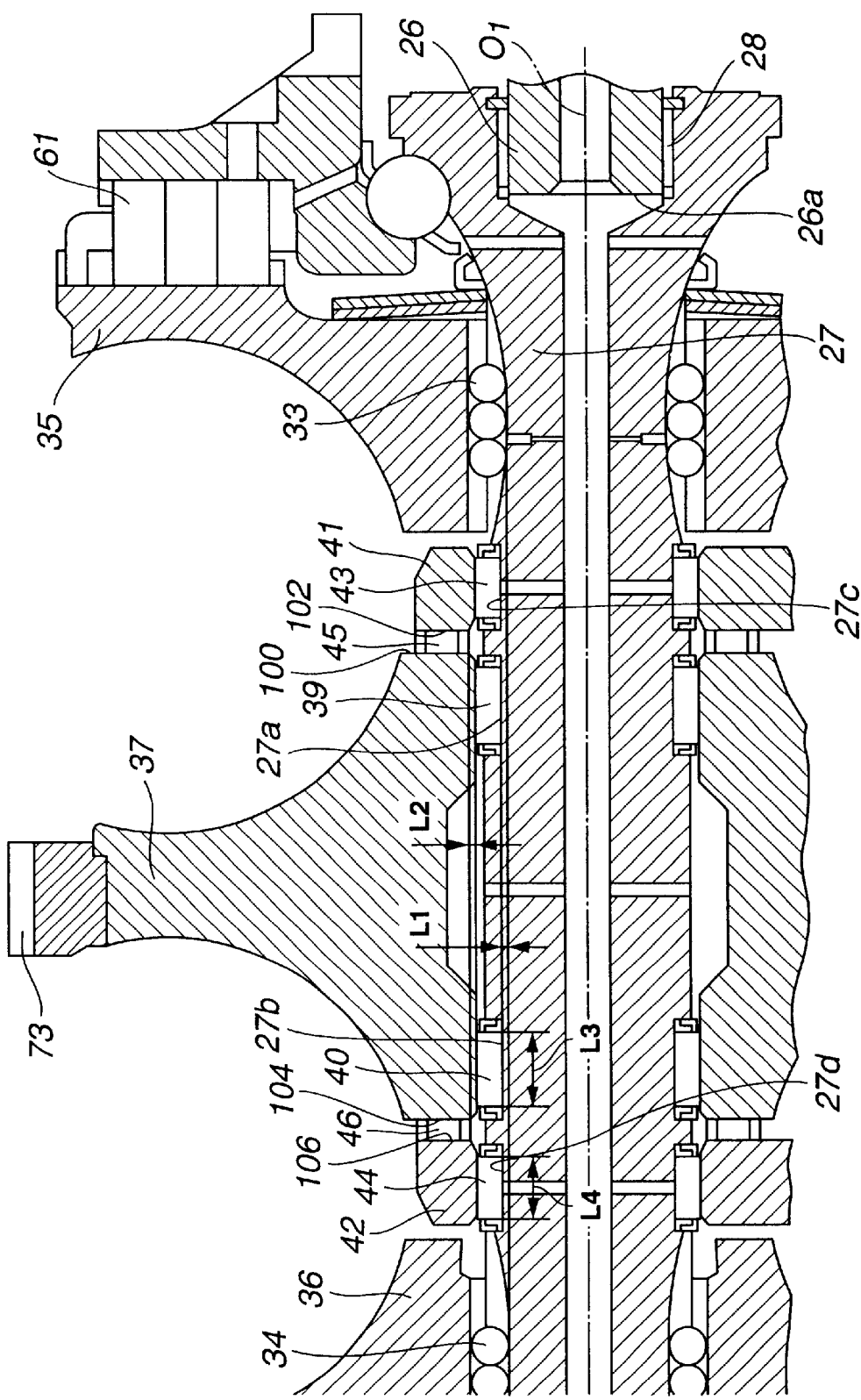
FIG. 4 is a slightly magnified view of a portion of FIG. 3.

Referring to FIG. 1, a torque delivery (TD) shaft 27 is mounted within casing 21 in axial alignment with an input shaft 26, which is provided for driving connection with an engine to receive engine torque. A ball bearing 29 is provided for front cover 22 to support input shaft 26. At one or front end portion, TD shaft 27 is held in opposed relationship with input shaft 26. A radial bearing 30 is fixedly coupled to the opposite or rear end portion of TD shaft 27 and received by the rear cover 23. Radial bearing 30 is provided for rear cover 23 to support TD shaft 27. As best seen in FIG. 4, in a preferred embodiment, TD shaft 27 has a mouth recessed inwardly from the front axial end thereof. The mouth receives a rear end boss 26a of input shaft 26. A radial bearing 28 is disposed between the inner wall of the mouth and boss 26a.

CVT 24 has two toroidal transmission (TT) units, namely, a front TT unit 31 and a rear TT unit 32. TD shaft 27 carries a first input disc 35 of TT unit 31 and a second input disc of TT unit 32 for a unitary rotation therewith. Disposed between input discs 35 and 36 is a common output disc 37. At its outer periphery, output disc 37 has a peripheral output gear 73. Output gear 73 is in meshing engagement with a clutch drum 68a of a gear train 25 to be described later. A loading cam 61 is in driving engagement with input shaft 26 to transmit rotation to the front input disc 35. The rotation is transmitted by TD shaft 27 to rear input disc 36.

As best seen in FIG. 2, each of TT units 31 and 32 has power rollers 38, which are carried by trunnions 51 for transmission of rotation between input disc 35 or 36 and output disc 37. At upper ends, trunnions 51 of each TT unit 31 or 32 are connected to a common upper link plate 52, while, at lower ends, they are connected to a common lower link plate 53. Servo pistons 54 are provided to move up or down trunnions 51, respectively, in response to controlled hydraulic pressure from a control valve assembly 55. Operation of TT unit 31 or 32 is well known from, for example, U.S. Pat. No. 5,902,208 issued to Nakano on May 11, 1999, U.S. Pat. No. 5,419,746 issued to Nakano on May 30, 1995, and U.S. Pat. No. 4,968,289 issued to Nakano on Nov. 6, 1990, each of which has been hereby incorporated by reference in its entirety.

Figure 3:
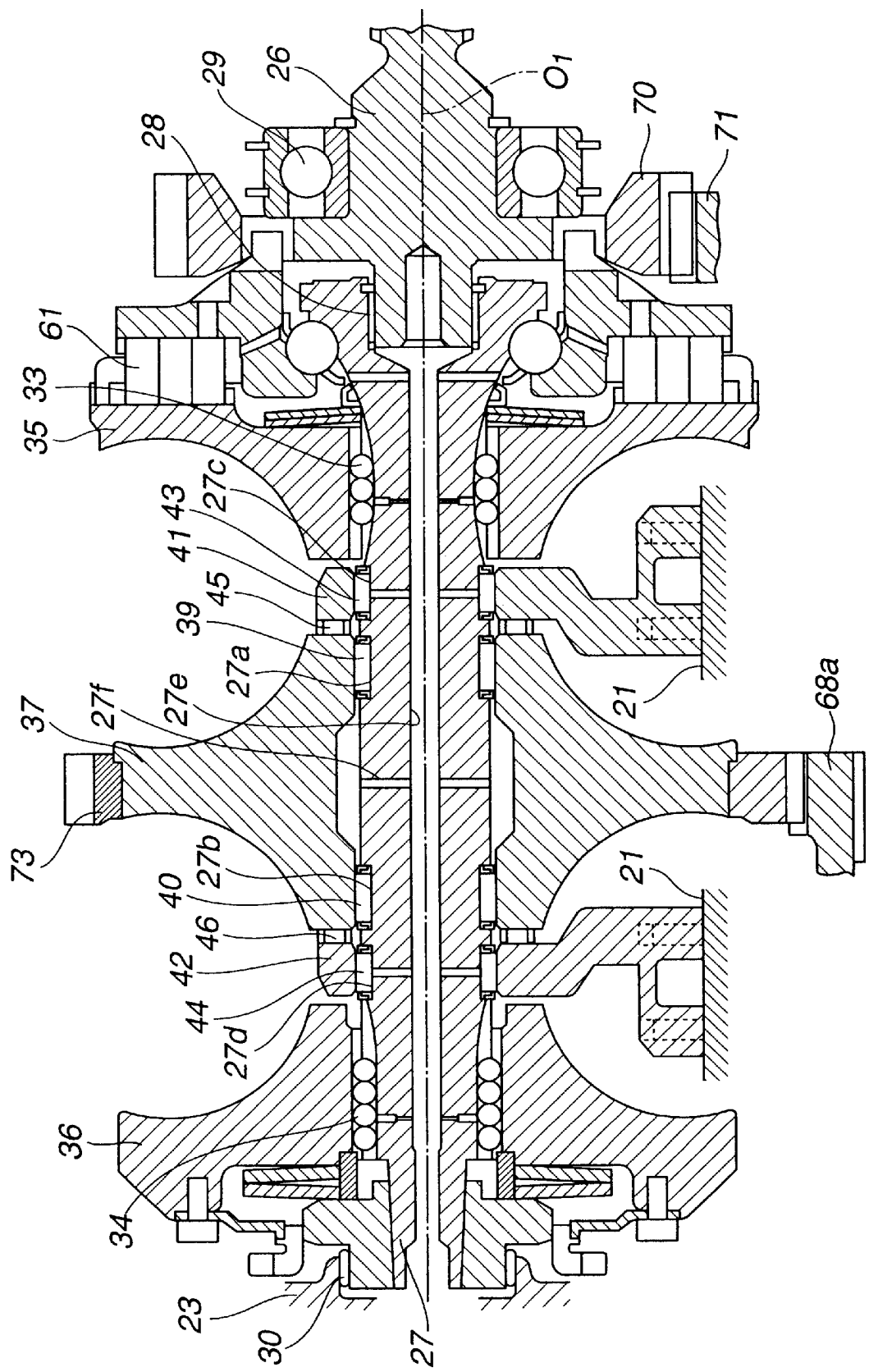
FIG. 3 is a longitudinal section along the axis $O_1$ of a portion of the CVT with unnecessary parts removed to show structure to cope with thrust load tending to tilt a common output disc from its predetermined normal upright position.

Referring to FIG. 3, output disc 37 has a central bore through which TD shaft 27 extends. Output disc 37 has a wall defining the central bore. At least one radial bearing is provided in rolling contact with the central bore defining wall and TD shaft 27 for allowing rotational displacement between the output disc 37 and TD shaft 27. In the embodiment, two radial bearings 39 and 40 are in rolling contact with the central bore defining wall and TD shaft 27. Radial bearing 39 is interposed between TD shaft 27 and output disc 37 at a portion adjacent forward side of disc 37. Radial bearing 40 is interposed between TD shaft 27 and output disc 37 at a portion adjacent the other or rearward side of output disc 37.

For noise reduction, a helical gear is used as output gear 73 in practical application.

During transmission of torque, output gear 73 applies thrust load to output disc 37 at a portion close to its outer periphery, tending to tilt output disc 37 from a predetermined upright normal position. Theoretically, a radial plane extending from an axis of rotation of output disc 37, which bisects output disc 37, lies in a radial plane extending from axis $O_1$ of rotation of TD shaft 27 when output disc 37 is held in the predetermined upright normal position. Because there is a considerable distance from axis $O_1$ to the portion where thrust load is applied, a moment due to thrust load tends to tilt output disc 37.

With continuing reference to FIG. 3, in order to cope with such thrust load tending to tilt output disc 37, supports 41 and 42 are provided. Supports 41 and 42 interpose therebetween output disc 37 to bear such thrust load tending to tilt output disc 37 from the predetermined upright normal position to hold output disc 37 in the predetermined position. Supports 41 and 42 have openings through which TD shaft 27 extends. Within such openings thereof, supports 41 and 42 have radial bearings 43 and 44, respectively. Radial bearings 43 and 44 are in rolling contact with TD shaft 27. Each of supports 41 and 42 is fixedly attached to transmission casing 21 in such a manner as to withstand in bearing the thrust load.

As best seen in FIG. 4, output disc 37 and support 41 have spaced opposed walls 100 and 102, respectively, while output disc 37 and support 42 have spaced opposed walls 104 and 106, respectively. Supports 41 and 42 have thrust bearings 45 and 46, respectively. Thrust bearing 45 is interposed between walls 100 and 102, while thrust bearing 46 interposed between walls 104 and 106.

From the preceding description of supports 41 and 42, it will be appreciated that output disc 37 is held in the predetermined upright normal position against moment induced by thrust load applied by output gear 73.

With reference to FIG. 4, TD shaft 27 has a first series of slots 33 in driving or ball-spline engagement with input disc 35 and a second series of slots 34 in driving or ball-spline engagement with input disc 36. For ease of positioning of radial bearings during assembly, TD shaft 27 has first peripheral grooves 27a and 27b receiving radial bearings 39 and 40, and second peripheral grooves (27c, 27d) receiving radial bearings 43 and 44, respectively. It is to be noted that the provision of first peripheral grooves 27a and 27b will make appreciable contribution to a reduction in radial distance from axis $O_1$ to the periphery of output disc 37, thereby to cause a reduction in moment.

Provision of peripheral grooves 27a, 27b, 27c and 27d does not cause any reduction in strength of TD shaft 27 as will be readily understood from the following description.

Each of first and second peripheral grooves 27a, 27b, 27c, and 27d has a bottom wall extending along a first imaginary circle having a first diameter. First series of slots 33 have bottom walls, respectively, which are arranged in a second imaginary circle having a second diameter. Second series of slots 34 have bottom walls, respectively, which are arranged in a third imaginary circle having a third diameter. In the embodiment, the second and third imaginary circles correspond to each other and thus the second and third diameters are the same.

The first diameter is not less than the second and third diameter by an amount indicated by L1 (see FIG. 4). The first diameter is less than an inner diameter of thrust bearings 43 and 44 by an amount L2 (see FIG. 4).

In the embodiment, in order to provide increased service life, each of first radial bearings 39 and 40 has a longer axial span L3 than axial span L4 of each of second radial bearings 43 and 44.

Figure 5:
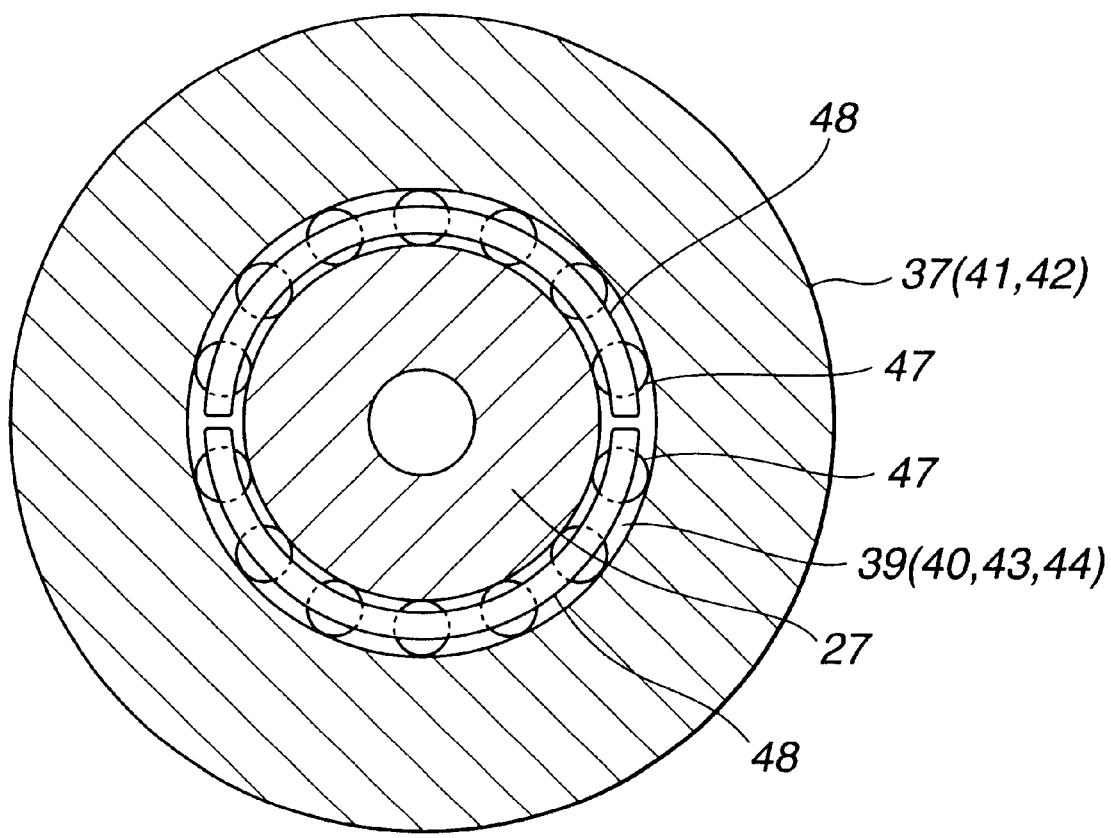
FIG. 5 is a diagram illustrating a needle bearing used in a preferred embodiment.
Figure 6:
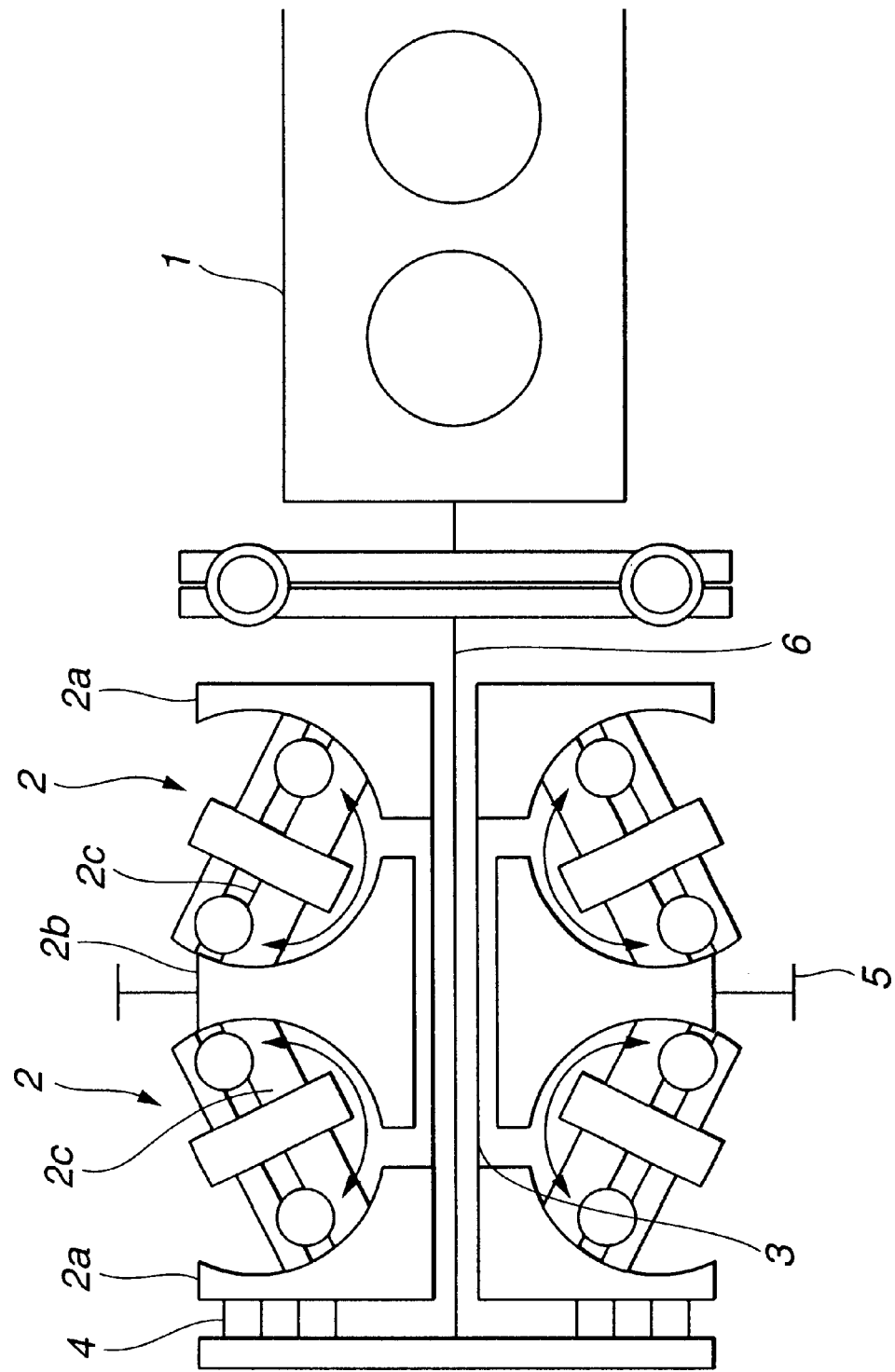
FIG. 6 is schematic view of a representative example of dual cavity toroidal CVT with the associated engine.

Referring to FIG. 5, each of the radial bearings 39, 40, 43, and 44 has a plurality of rollers 47 and a outwardly expandable cage 48. Cage 48 is so constructed as to fit into the corresponding one of first and second peripheral grooves 27a, 27b, 27c, and 27d. In the embodiment, cage 48 consists of two parts.

Normally, supports 41 and 42 hold TD shaft 27 for rotation about axis $O_1$. If there is variation of input torque large enough to tilt TD shaft 27, at least one or radial bearings 28 and 30 temporarily support TD shaft 27. This means that clearances may exist where radial bearings 28 and 30 are arranged. It is now appreciated that TD shaft 27 and its associated parts are easy to assemble with sufficiently high shaft supporting rigidity maintained.

In the embodiment, radial bearing 28 is less distant from the radial plane bisecting the output disc 37 than radial bearing 30 is. In this arrangement, radial bearing 28 supports TD shaft 27 before radial bearing 30 does when TD shaft tends to tilt so that any interference between TD shaft 27 and transmission casing 21 may be avoided.

Turning back to FIG. 1, gear train 25 is briefly described. Gear train 25 has a planetary gear set (PGS) 65, a low clutch 66, an output gear 67, a high clutch 68 supported by an auxiliary shaft 62.

PGS 65 includes a sun gear 65s, a carrier 65c, and a ring gear 65r. Sun gear 65s is fixedly connected to auxiliary shaft 62, while clutch drum 68a of high clutch 68 is fixedly connected to auxiliary shaft 62. As mentioned before, output gear 73 is drivingly connected to clutch drum 68a. Accordingly, sun gear 65s is drivingly connected to output gear 73 of output disc 37. Low clutch 66 is provided to selectively transmit rotation of input shaft 26 to carrier 65c. Clutch drum 66a is supported via a ball bearing 69 by auxiliary shaft 62, and its is drivingly connected to input shaft 26 via a gear train that includes a gear 70 of input shaft 26, an idler gear 71, and a gear 72. Gear 72 is fixedly attached to clutch drum 66a. Clutch hub 66b is connected to carrier 65c.

Sun gear 65s is fixedly coupled, via serration, to auxiliary shaft 62. Ring gear 65r is connected to output gear 67.

High clutch 68 is provided to connect output gear 73 of CVT 24 to output gear 67. Clutch drum 68a is in meshing engagement with output gear 73, while clutch hub 68b is connected to output gear 67.

While the present invention has been particularly described, in conjunction with the preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Application No. 2000-270075, filed Sep. 6, 2000, the disclosure of which is hereby incorporated by reference in its entirety.

What is claimed is:

1. A toroidal, continuously variable transmission (CVT) comprising:

two toroidal transmission units having a first disc, a second disc, a third disc, and a torque delivery shaft carrying the first and second discs coaxially for a unitary rotation therewith, the third disc being a common disc to the first and second discs and disposed between the first and second discs in operative cooperation therewith, the third disc having a peripheral gear and a central bore through which the torque delivery shaft extends, the third disc having a wall defining a central bore;

at least one radial bearing in rolling contact with the central bore defining wall and the torque delivery shaft for allowing a rotational displacement between the third disc and the torque delivery shaft; and supports interposing therebetween the third disc to bear the thrust load tending to tilt the third disc from a predetermined position, wherein the third disc and one of the supports have spaced opposed walls, respectively, and the third disc and the other of the two supports have spaced opposed walls, respectively;

wherein the supports have thrust bearings, respectively, one being interposed between the two spaced opposed walls of the third disc and the one support, the other being interposed between the two spaced opposed walls of the third disc and the other support; and wherein the torque delivery shaft has a first series of slots in driving engagement with the first disc, a second series of slots in driving engagement with the second disc, at least one first peripheral groove receiving the third disc supporting radial bearing, and second peripheral grooves receiving second radial bearings, respectively.

2. A toroidal continuously variable transmission (CVT) comprising:

two toroidal transmission units having a first disc, a second disc, a third disc, and a torque delivery shaft carrying the first and second discs coaxially for a unitary rotation therewith, the third disc being a common disc to the first and second discs and disposed between the first and second discs in operative cooperation therewith, the third disc having a peripheral gear and a central bore through which the torque delivery shaft extends, the third disc having a wall defining the central bore;

at least one radial bearing in rolling contact with the central bore defining wall and the torque delivery shaft for allowing a rotational displacement between the third disc and the torque delivery shaft; and supports interposing therebetween the third disc to bear thrust load tending to tilt the third disc from a predetermined position to hold the third disc in the predetermined position, wherein the at least one radial bearing includes two third disc supporting radial bearings, one of which is between the torque delivery shaft and the third disc at a portion adjacent one side thereof and the other of which is between the torque delivery shaft and the third disc at a portion adjacent the other side thereof;

wherein the torque delivery shaft has a first series of slots in driving engagement with the first disc, a second series of slots in driving engagement with the second disc, first peripheral grooves receiving the third disc supporting radial bearings, respectively, and second peripheral grooves receiving second radial bearings, respectively;

wherein each of the first and second peripheral grooves has a bottom wall extending along a first imaginary circle having a first diameter, the first series of slots have bottom walls, respectively, which are arranged in a second imaginary circle having a second diameter, and the second series of slots have bottom walls, respectively, which are arranged in a third imaginary circle having a third diameter; and wherein the first diameter is not less than the second and third diameters.

3. A toroidal CVT as claimed in claim 2, wherein each of the radial bearings has a plurality of rollers and an outwardly expandable cage for the plurality of rollers, and wherein the cage is so constructed as to fit into the corresponding one of the first and second peripheral grooves.

* * * * *